UNITED STATES PATENT OFFICE.

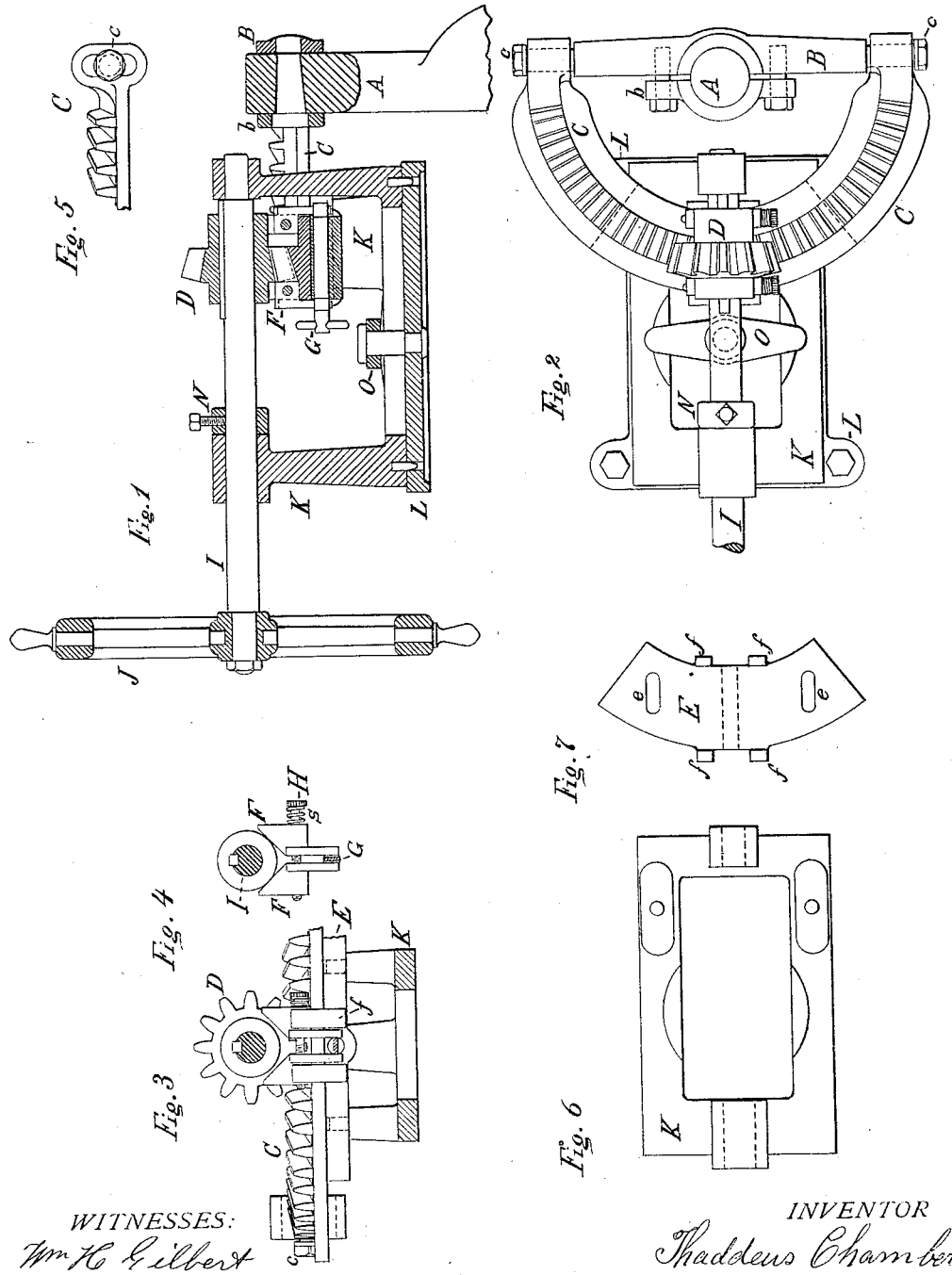

THADDEUS CHAMBERS, OF PHILADELPHIA, PENNSYLVANIA, ASSIGNOR OF ONE-HALF TO DAVID KNIGHT GILBERT, OF SAME PLACE.

STEERING APPARATUS.

SPECIFICATION forming part of Letters Patent No. 336,291, dated February 16, 1886.

Application filed October 22, 1885. Serial No. 180,570. (No model.)

*To all whom it may concern:*

Be it known that I, THADDEUS CHAMBERS, a citizen of the United States, residing in the city and county of Philadelphia, in the State of Pennsylvania, have invented a new and useful Improvement in Steering Apparatus, of which the following is a specification.

My invention consists of a steering apparatus which is readily attached to or removed from the rudder-post, is not liable to get out of order, and in which the steering-wheel is not affected by the blows of the waves on the rudder. The device is furthermore so constructed that if the rudder is loose in its bearings the resulting irregular motion will not affect the mechanism.

The apparatus consists of a segmental bevel-gear hinged at its extremities to a cross-head clamped on the rudder-post, a friction-plate on which this segmental gear slides, a bevel-pinion on a hand-wheel shaft engaging with the segmental gear, a stand or bracket forming the bearing for the shaft, and an adjustable friction device for causing friction among the several parts, in order to keep the rudder in position.

The whole apparatus is so constructed that it can, in the case of breakage, for instance, be quickly removed, and an ordinary tiller used instead.

In the accompanying drawings, Figure 1 shows a longitudinal section, and Fig. 2 a plan view, of the entire mechanism as attached to the head of a rudder. Figs. 3 and 4 are transverse sections showing the friction device. Figs. 6 and 7 are plan views of the stand or frame and the friction-plate, respectively. Fig. 5 represents a side view of one of the extremities of the segmental gear, and shows the method of connecting the same with the cross-head.

On the rudder-post A is clamped the cross-head B, with the cap $b$. The segmental gear C is attached to this cross-head by the bolts $c\ c$, which pass through slots in the ends of B, as shown in Fig. 5. This permits the rudder to move up and down without straining the gearing. A backward and forward motion of the rudder-post will cause the gear C, plate E, the pinion D, and the friction device to move with it. In order that the pinion D may follow this motion, it can slide freely on the shaft I, but is prevented from turning by a key or feather. The plate E slides on the top of the two lugs of the frame K. Two studs project from these lugs and work in the slots $e\ e$ in the plate E, which is thus kept in place, although permitted to make a limited motion to and fro.

The friction device is constructed as follows: The pinion D has on each side a projecting hub. The segmental gear C has on each side of the gear-teeth a circular ledge or flange. On each of these ledges and under the hubs of the pinion rest one pair of wedges, as shown in Figs. 3 and 4. A screw, H, passes through the blocks or wedges F F, being free in one and screwed into the other. Under its head, which is of such a shape as to be easily turned by the fingers, is a spring, $s$. This spring draws the two blocks together and wedges them under the hubs of the pinion. By turning the screw the tension of the spring $s$, and consequently the friction produced, may be regulated. Between lugs or projections of the wedges works a cam, G, which has a bearing in the plate E, and is provided at its outer extremity with a handle. By turning this in one or the other direction the wedges are either separated, as in Fig. 3, thus removing the friction, or the spring is permitted to draw them together and wedge them under the hub of the pinion, as shown in Fig. 4. It will be seen that friction is thus produced between all of the working-surfaces in the device, and the rudder will not be affected by blows from the waves, although but little more force is required at the wheel. Ordinarily one pair of friction-wedges will be found quite sufficient, and one of the sets, (preferably the inner,) together with the respective flange of the segmental gear, may be dispensed with.

In order to keep the friction-wedges in place, the plate E has projecting lugs $f\ f\ f\ f$, which serve to retain the wedges in position. Of course but one pair of these lugs is required if only one pair of friction-wedges be used. The frame K consists of a plate or frame with two uprights, forming the bearings of the shaft I, and two other uprights or projections, which support the plate E. The shaft I is prevented from moving endwise by the collar N (which is fastened on the shaft by a set-screw) and a shoulder on the one end of the shaft I. In place of a shoulder, another collar may be used.

The frame K is secured to the bed-plate L by means of the turn-button O. Dowel-pins fix the proper position. The plate L is firmly fastened to the deck. This method of securing the frame to a bed-plate may of course be varied. For instance, the turn-button may be attached to the frame and two lugs or hooks be attached to the bed-plate, under which hooks the turn-button will catch; or a wedge passing through a slotted stud, which is attached to one piece and passes through the other, can also be used. The bed-plate L may be entirely dispensed with and the frame secured by any of the above-mentioned methods directly to the deck. By securing the frame in any of these ways the device can readily be removed at any moment—as, for instance, in the event of breakage—and an ordinary tiller be used to work the rudder. Thus by turning the button O the entire apparatus can be swung over on the bolts c c, behind the rudder-head and out of the way, or by slackening the set-screw in the collar N the hand-wheel shaft can be withdrawn. The pinion and the friction device may then be removed and the segmental gear swung over behind the rudder-post. The frame K, after turning the button O, may then be removed.

In order that a tiller may be used, there is a hole through the top of the rudder-post, and there are corresponding openings in the cross-head B and clamp b, as shown in Fig. 1.

I claim—

1. In steering apparatus, the combination of the cross-head B, attached to the rudder-head, the segmental gear C, hinged to the said cross-head at its extremities, the pinion D, meshing with the segmental gear, the hand-wheel shaft I, stand K, and collar N, the plate E, the friction-wedges F, with screw H, spring s, and cam G, all substantially as and for the purpose herein specified.

2. In steering apparatus, the combination of the frame K and turn-button O, the latter being either attached to the bed-plate L, or, in the absence of such a plate, to the deck of the vessel direct, all substantially as and in the manner herein specified.

3. In steering apparatus where a segmental gear connected to the rudder-post is used, the combination of the said segmental gear, a cross-head attached to the rudder-post, and two bolts screwed in the ends of the said cross-head and passing through vertical slots in the extremities of the segmental gear, all substantially as and for the purpose herein specified.

THADDEUS CHAMBERS.

Witnesses:
WM. H. GILBERT,
GEO. R. CROWERS.